(12) United States Patent
Hayashi et al.

(10) Patent No.: US 10,164,281 B2
(45) Date of Patent: Dec. 25, 2018

(54) FUEL-CELL UNIT CELL

(71) Applicant: TOYOTA JIDOSHA KABUSHIKI KAISHA, Toyota-shi, Aichi-ken (JP)

(72) Inventors: Daisuke Hayashi, Nisshin (JP); Atsushi Ida, Nisshin (JP); Kazunori Shibata, Mishima (JP); Nobuaki Nonoyama, Chiryu (JP); Shuji Kurita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 29 days.

(21) Appl. No.: 15/608,962

(22) Filed: May 30, 2017

(65) Prior Publication Data

US 2017/0373336 A1 Dec. 28, 2017

(30) Foreign Application Priority Data

Jun. 24, 2016 (JP) ................. 2016-125353

(51) Int. Cl.
*H01M 8/1004* (2016.01)
*H01M 8/0247* (2016.01)
(Continued)

(52) U.S. Cl.
CPC ......... *H01M 8/1004* (2013.01); *H01M 8/026* (2013.01); *H01M 8/0247* (2013.01); *H01M 8/0254* (2013.01)

(58) Field of Classification Search
CPC ........ H01M 8/02; H01M 8/10; H01M 8/1004; H01M 8/0247; H01M 8/026; H01M 8/04
See application file for complete search history.

(56) References Cited

U.S. PATENT DOCUMENTS

2003/0215695 A1* 11/2003 Suzuki ............... H01M 8/0228
429/434
2013/0316263 A1 11/2013 Roshanzamir et al.
2015/0180052 A1 6/2015 Leger et al.

FOREIGN PATENT DOCUMENTS

JP 2004241141 A 8/2004
JP 2006-127770 A 5/2006
(Continued)

*Primary Examiner* — Kenneth J Douyette
(74) *Attorney, Agent, or Firm* — Dickinson Wright, PLLC (57) ABSTRACT

A fuel-cell unit cell comprises: a membrane electrode and gas diffusion layer assembly; a cathode-side separator made of a press-molded plate, the cathode-side separator forming a plurality of cathode gas flow paths and non-flow-path portions therebetween on a cathode-side surface of the membrane electrode and gas diffusion layer assembly; and an anode-side separator made of a press-molded plate, the anode-side separator forming a plurality of anode gas flow paths and non-flow-path portions therebetween on an anode-side surface of the membrane electrode and gas diffusion layer assembly. At least one gas flow path among the plural cathode gas flow paths and the plural anode gas flow paths includes a constricting portion that is configured to reduce a flow-path height in a stacking direction of the fuel-cell unit cells as well as to reduce a flow path cross-sectional area of the gas flow path. When projected and observed along the stacking direction, the plural cathode gas flow paths and the plural anode gas flow paths are configured to have mutually different two-dimensional shapes, there exist intersect positions at which the cathode gas flow paths and the anode gas flow path intersect each other, and the constricting portion is provided at a position other than the intersect positions.

7 Claims, 9 Drawing Sheets

(51) Int. Cl.
*H01M 8/026* (2016.01)
*H01M 8/0254* (2016.01)

(56) References Cited

FOREIGN PATENT DOCUMENTS

| | | |
|---|---|---|
| JP | 2007-207731 A | 8/2007 |
| JP | 2010-061981 A | 3/2010 |
| JP | 2011-238409 A | 11/2011 |
| WO | 2013105956 A1 | 7/2013 |

* cited by examiner

FUEL-CELL UNIT CELL

CROSS REFERENCE TO RELATED APPLICATIONS

This application claims priority to Japanese Patent Application No. 2016-125353 filed on Jun. 24, 2016, the entire contents of which are incorporated by reference herein.

BACKGROUND

Field

The present disclosure relates to a fuel-cell unit cell.

Related Art

Generally, a fuel cell has a fuel cell stack in which a plurality of unit cells are stacked. Each unit cell has a membrane electrode and gas diffusion layer assembly with a power generation region therein, and two separators for sandwiching the membrane electrode and gas diffusion layer assembly therebetween. The membrane electrode and gas diffusion layer assembly is formed such that one electrolyte membrane is sandwiched between two electrode catalyst layers, which are further sandwiched between two gas diffusion layers. The power generation region is a region coincident with a region over which the two electrode catalyst layers overlap with each other. On one surface of each separator, a plurality of reactant gas flow paths are formed for supplying reactant gas to the membrane electrode and gas diffusion layer assembly. In more detail, a plurality of fuel gas flow paths (anode gas flow paths) are formed on one surface of the anode-side separator out of the two separators, and a plurality of oxidizing gas flow paths (cathode gas flow paths) are formed on one surface of the cathode-side separator. The fuel cell stack has, in general, a stack structure in which an anode-side separator and a cathode-side separator of neighboring unit cells are in contact with each other.

WO 2013/105956A describes a fuel cell in which constricting portions are provided in both the anode gas flow paths and the cathode gas flow paths in order to efficiently supply anode gas and cathode gas to the membrane electrode and gas diffusion layer assembly. The constricting portions are formed by reducing the height of the gas flow paths. Whereas neighboring separators of two unit cells are in contact with each other at outer walls of protruded portions of the gas flow paths, the separators structurally do not contact each other at the constricting portions that are smaller in height in the gas flow paths.

As to the cathode gas flow paths and the anode gas flow paths, their proper two-dimensional shapes may differ depending on their desirable characteristics. For example, for the cathode gas flow paths, their preferable flow path shapes are those allowing easier discharge of liquid water generated by fuel cell reactions. On the other hand, for the anode gas flow paths, such flow path shapes are preferable as to enhance the utilization efficiency of the anode gas (e.g., hydrogen). Also, their preferable flow path shapes may differ from each other depending on the placement of gas manifold holes as well. Thus, when the cathode gas flow paths and the anode gas flow paths are different in two-dimensional shape from each other, there is a possibility that contact portions between the cathode-side separator and the anode-side separator of neighboring two fuel-cell unit cells are reduced, as compared with cases in which the gas flow paths are of an identical two-dimensional shape as in WO 2013/105956A. For this reason, there has been a problem that depending on the positions of the constricting portions, contact portions over which the cathode-side separator and the anode-side separator of neighboring two fuel-cell unit cells are in contact with each other may be reduced, with the result that compressive force may be concentrated excessively to the other portions.

SUMMARY

The present disclosure, having been accomplished to solve at least part of the above-described problems, can be implemented in the following aspects.

(1) According to an aspect of the disclosure, there is provided a fuel-cell unit cell for making up a fuel cell stack in which a plurality of fuel-cell unit cells are stacked while a cathode-side separator and an anode-side separator of neighboring fuel-cell unit cells are in contact with each other. The fuel-cell unit cell comprises: a membrane electrode and gas diffusion layer assembly; a cathode-side separator made of a press-molded plate, the cathode-side separator forming a plurality of cathode gas flow paths and non-flow-path portions therebetween on a cathode-side surface of the membrane electrode and gas diffusion layer assembly; and an anode-side separator made of a press-molded plate, the anode-side separator forming a plurality of anode gas flow paths and non-flow-path portions therebetween on an anode-side surface of the membrane electrode and gas diffusion layer assembly. At least one gas flow path among the plural cathode gas flow paths and the plural anode gas flow paths includes a constricting portion that is configured to reduce a flow-path height in a stacking direction of the fuel-cell unit cells as well as to reduce a flow path cross-sectional area of the gas flow path. When projected and observed along the stacking direction, the plural cathode gas flow paths and the plural anode gas flow paths are configured to have mutually different two-dimensional shapes, there exist intersect positions at which the cathode gas flow paths and the anode gas flow path intersect each other, and the constricting portion is provided at a position other than the intersect positions.

According to the fuel-cell unit cell in this aspect, since the constricting portion of a gas flow path is provided at a position other than the intersect positions of the cathode gas flow paths and the anode gas flow paths, contact portions between the two separators are not reduced due to the placement of the constricting portion, thereby preventing excessive concentration of compressive force to other portions.

(2) In another aspect, one of the plural cathode gas flow paths and the plural anode gas flow paths may be configured to have straight flow path portions over which a plurality of gas flow paths extend linearly and parallel to one another, and the other of the plural cathode gas flow paths and the plural anode gas flow paths may be configured to have curved flow path portions in which a plurality of gas flow paths are meandering or bent while maintaining a spacing from one another. According to the fuel-cell unit cell in this aspect, since the constricting portion of a gas flow path is provided at a position other than the intersect positions of the straight flow path portions and the curved flow path portions, contact portions between the two separators are not reduced due to the placement of the constricting portion, thereby preventing excessive concentration of compressive force to other portions.

(3) In still another aspect, the straight flow path portions may be provided in the cathode-side separator, and the curved flow path portions may be provided in the anode-side separator. According to the fuel-cell unit cell in this aspect, since the straight flow path portions are provided in the cathode-side separator, discharge efficiency of liquid water from the cathode gas flow paths will be enhanced. In addition, since the curved flow path portions are provided in the anode-side separator, the anode gas flow paths will be increased in flow path length, thereby enhancing the utilization efficiency of anode gas.

(4) In another aspect, the constricting portion may be provided in each of two gas flow paths neighboring and running in parallel to each other in at least one of the plural cathode gas flow paths and the plural anode gas flow paths, and the constricting portions provided in the two gas flow paths may be placed at non-neighboring positions in a direction perpendicular to a direction of the parallel running. According to the fuel-cell unit cell in this aspect, the gas utilization efficiency will be enhanced because gas flowing through neighboring two gas flow paths is diffused through the gas diffusion layers in contact with the non-flow-path portions before and after the individual constricting portions.

(5) In another aspect, the constricting portion may be provided at a position other than an outlet of the at least one gas flow path. The fuel-cell unit cell in this aspect will suppress an occurrence of a phenomenon where outlets of gas flow paths are clogged with liquid water, resulting in a retardation in the flow of gas into the relevant gas flow paths.

The present disclosure may also be implemented in various modes other than the above-described aspects. For example, the disclosure can be implemented in such modes as fuel cell stacks, fuel cell systems, and fuel cell vehicles.

DESCRIPTION OF EMBODIMENTS

First Embodiment

Figure 1:
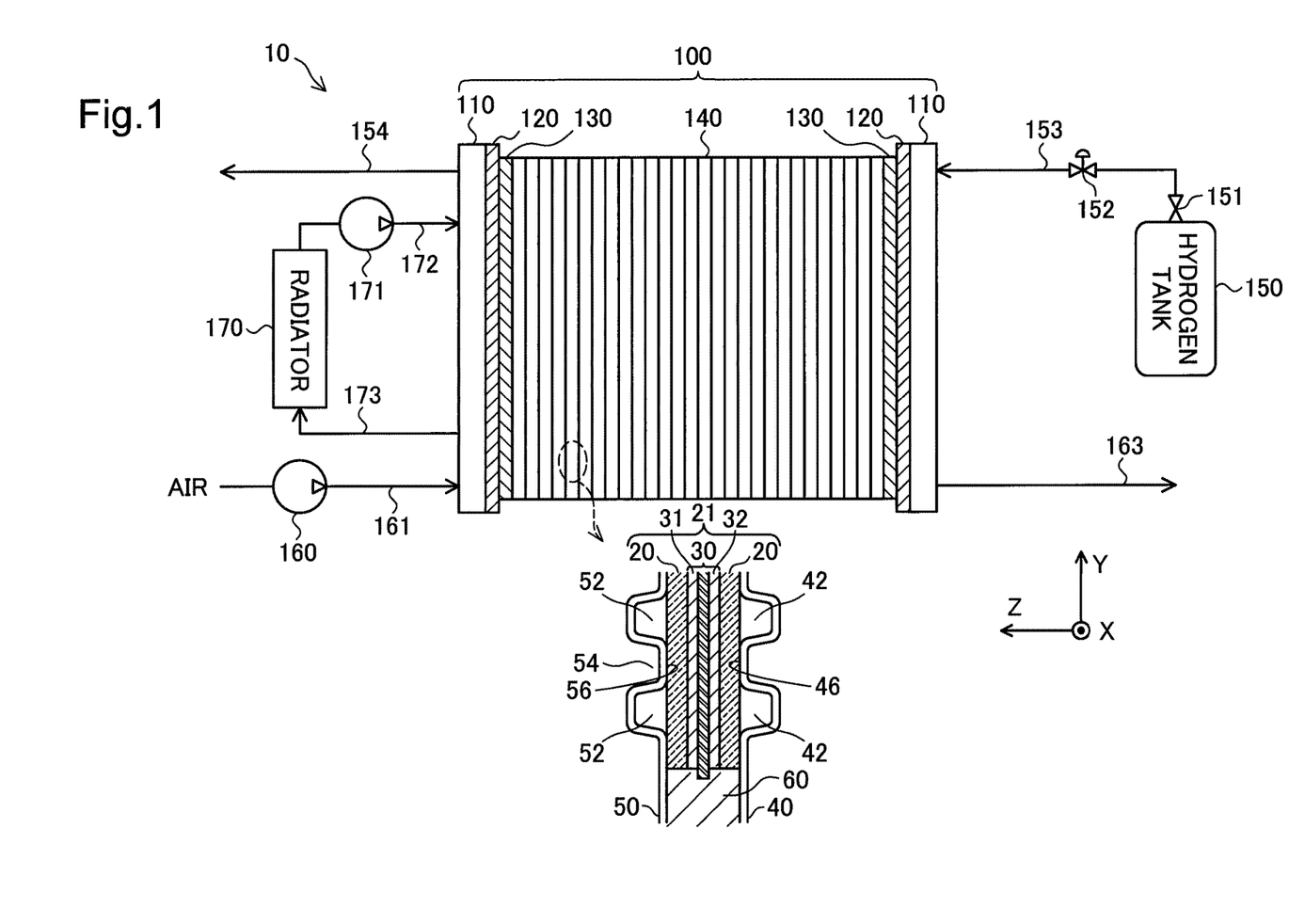
FIG. 1 is an explanatory view showing a schematic configuration of a fuel cell system according to a first embodiment.

FIG. 1 is an explanatory view showing a schematic configuration of a fuel cell system 10 according to a first embodiment of the disclosure. The fuel cell system 10 is equipped with a fuel cell stack 100. The fuel cell stack 100 includes an end plate 110, an insulating plate 120, a current collector plate 130, a plurality of fuel-cell unit cells (hereinafter, abbreviated as 'unit cells') 140, another current collector plate 130, another insulating plate 120, and another end plate 110, as these are stacked in this order. A stacking direction Z of the unit cells 140 is a horizontal direction perpendicular to a vertical direction Y. A direction normal to the drawing sheet and perpendicular to both the vertical direction Y and the stacking direction Z is a horizontal direction X.

Hydrogen is supplied as an anode gas to the fuel cell stack 100 from a hydrogen tank 150, in which high-pressure hydrogen is stored, via a shutoff valve 151, a regulator 152, and piping 153. Anode gas that has not been used in the fuel cell stack 100 is discharged via discharge piping 163 to outside of the fuel cell stack 100. The fuel cell system 10 may also have a recirculation mechanism for recirculating anode offgas to the piping 153 side. Air is supplied as a cathode gas to the fuel cell stack 100 via an air pump 160 and piping 161. Cathode gas that has not been used in the fuel cell stack 100 is discharged via discharge piping 154 to outside of the fuel cell stack 100. It is noted that anode gas and cathode gas may be referred to also as reactant gases.

For cooling of the fuel cell stack 100, a cooling medium cooled by a radiator 170 is supplied to the fuel cell stack 100 via a water pump 171 and piping 172. The cooling medium discharged from the fuel cell stack 100 is circulated to the radiator 170 via piping 173. The cooling medium may be, for example, water, ethylene glycol or other antifreezes.

Each unit cell 140 includes a membrane electrode assembly 30, two gas diffusion layers 20, a resin frame member 60, and a pair of separators, i.e. an anode-side separator 50 and a cathode-side separator 40. The membrane electrode assembly 30 is so structured that an anode electrode catalyst layer 31 and a cathode electrode catalyst layer 32 are set on both side surfaces of an electrolyte membrane, respectively. The gas diffusion layers 20 are stacked on both sides of the membrane electrode assembly 30, respectively. The membrane electrode assembly 30 and the two gas diffusion layers 20 constitute a Membrane-Electrode-and-Gas-diffusion-layer Assembly (hereinafter, referred to as 'MEGA') 21. The resin frame member 60 is placed so as to surround the outer periphery of the MEGA 21. The MEGA 21 and the resin frame member 60 are sandwiched in the stacking direction Z by the anode-side separator 50 and the cathode-side separator 40.

The two separators 40, 50 have protruded-and-recessed surfaces (or patterned indented surfaces) formed thereon, and gas flow paths 42, 52 are formed by putting protruded portions 46, 56 of the protruded-and-recessed surfaces into contact with the gas diffusion layers 20. Whereas recessed portions of the protruded-and-recessed surfaces allow the gas to flow therethrough, the protruded portions 46, 56 in contact with the gas diffusion layers 20 scarcely allow gas to flow therethrough and therefore such protruded portions 46, 56 are called 'non-flow-path portions.' As to the anode-side separator 50, a plurality of stripe-like anode gas flow paths 52 are formed on an anode-side surface of the MEGA 21 while a plurality of stripe-like cooling medium flow paths 54 are formed on the opposite-side surface. On the anode-side surface of the anode-side separator 50, the non-flow-path portions 56 between the plural anode gas flow paths 52 are in contact with the gas diffusion layer 20. As to the cathode-side separator 40, a plurality of stripe-like cathode gas flow paths 42 are formed on the cathode-side surface of the cathode-side separator 40. On the cathode-side surface of the cathode-side separator 40, the non-flow-path portions 46 between the plural cathode gas flow paths 42 are also in contact with the gas diffusion layer 20.

Figure 2:
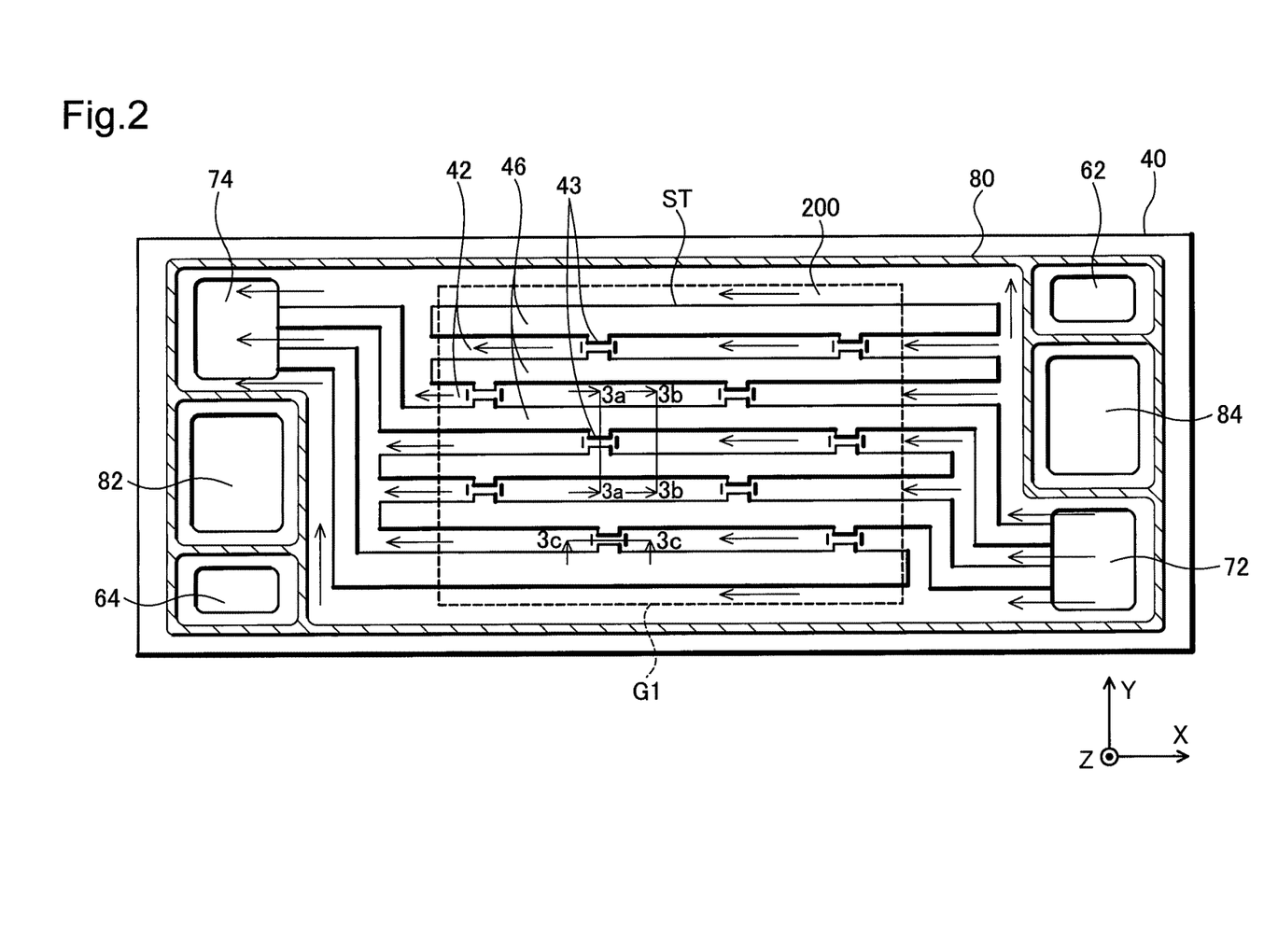
FIG. 2 is a schematic plan view of a cathode-side separator in the first embodiment.

FIG. 2 is a schematic plan view of a cathode-side separator 40 as viewed from the MEGA 21 side in the first embodiment. In FIG. 2, shading is applied to some lines to show recesses and protrusions. The cathode-side separator 40 and the anode-side separator 50 are formed of a member having gas barrier property and electron conductivity; for example, stainless steel, titanium or other metal plates may be used as the separators. The cathode-side separator 40 and the anode-side separator 50 are press-molded plates formed by pressing of metal plates.

In one-end edge portion of the cathode-side separator 40 in the horizontal direction X, there are disposed an anode-gas inlet manifold hole 62, a cooling-medium outlet manifold hole 84, and a cathode-gas inlet manifold hole 72 as mentioned in descending order along the vertical direction Y. Oppositely, in the other-end edge portion, there are disposed a cathode-gas outlet manifold hole 74, a cooling-medium inlet manifold hole 82, and an anode-gas outlet manifold hole 64 as mentioned in descending order along the vertical direction Y. The anode-gas inlet manifold hole 62 and the anode-gas outlet manifold hole 64, the cathode-gas inlet manifold hole 72 and the cathode-gas outlet manifold hole 74, and the cooling-medium inlet manifold hole 82 and the cooling-medium outlet manifold hole 84 are placed so as to be opposed to each other, respectively, with a central part of the cathode-side separator 40 interposed therebetween. In the state that the two separators 40, 50 are stacked so as to sandwich the MEGA 21 therebetween, the cathode-gas inlet manifold hole 72, the cathode gas flow paths 42 and the cathode-gas outlet manifold hole 74 are communicated with one another, constituting a cathode-gas flow path surface 200.

In FIG. 2, a seal member 80 is placed on the cathode-side separator 40 so as to surround the manifold holes 62, 64 for the anode gas, the manifold holes 82, 84 for the cooling medium, and the cathode-gas flow path surface 200, respectively. The seal member 80 is hatched for convenience of illustration. The seal member 80 is to be put into contact with surfaces of an assembled unit of the MEGA 21 and the resin frame member 60, serving for sealing between the cathode-side separator 40 and the assembled unit. More specifically, in the seal member 80, its portions surrounding the manifold holes 62, 64 serve for suppressing leakage of the anode gas, its portions surrounding the manifold holes 82, 84 serve for suppressing leakage of the cooling medium, and its portions surround the cathode-gas flow path surface 200 serve for suppressing leakage of the cathode gas. The seal member 80 is formed by injection molding, press molding or the like, where rubber, thermoplastic elastomer or the like may be used as the material of the seal member 80. The seal member 80 may be fixed to the separator with adhesive.

Referring to FIG. 2, when the MEGA 21 (FIG. 1) is observed as projected in the stacking direction Z, a power generation region G1 indicated by broken line is a region over which the anode electrode catalyst layer 31 and the cathode electrode catalyst layer 32 overlap with each other (i.e., a region which is a logical product of the two layers). Typically, the cathode electrode catalyst layer 32 is smaller than the anode electrode catalyst layer 31, so that the power generation region G1 coincides with the region of the cathode electrode catalyst layer 32. On the cathode side of the power generation region G1, there occurs a reaction of the following formula (1):

$$(\tfrac{1}{2})O_2 + 2H^+ + 2e^- \rightarrow H_2O \qquad (1)$$

Cathode gas supplied from the cathode-gas inlet manifold hole 72 of the cathode-side separator 40 is distributed to the cathode gas flow paths 42 as indicated by arrows in FIG. 2, passing through the gas diffusion layer 20 (FIG. 1) and reaching the cathode electrode catalyst layer 32 so as to be utilized for the above reaction. Thereafter, cathode gas that has not been used for the reaction is gathered by the cathode-gas outlet manifold hole 74, then discharged out of the fuel cell stack 100 (FIG. 1).

The cathode gas flow paths 42 in the power generation region G1 includes straight flow path portions ST extending linearly and parallel to one another in the longitudinal direction of the cathode-side separator 40. With regard to the straight flow path portions ST, their portions other than later-described constricting portions 43 are constant in terms of both width and flow path cross-sectional area of the individual cathode gas flow paths 42. Portions between neighboring cathode gas flow paths 42 are those protruded in the Z direction, corresponding to the non-flow-path portions 46 shown in FIG. 1. It is noted that providing the straight flow path portions ST in the cathode-side separator 40 makes it possible to enhance the discharge efficiency of liquid water generated by the fuel cell reaction. The straight flow path portions ST are preferably formed so as to extend in straight line between both ends of the power generation region G1 in its longitudinal direction (or X direction). This formation allows the discharge of liquid water to be carried out more easily.

The plural cathode gas flow paths 42 are configured such that they are separated into at least some plural flow paths across the entire path range between the two cathode-gas manifold holes 72, 74 without the entirety of the plural cathode gas flow paths 42 being merged together. However, as in the example of FIG. 2, some of the cathode gas flow paths 42 (in particular, some cathode gas flow paths of the straight flow path portions ST) may be merged with other cathode gas flow paths 42 to be communicated with the gas manifold hole 72 (or 74). With this configuration where the plural cathode gas flow paths 42 are formed so as to be separated into some plural flow paths across the entire path range between the two gas manifold holes 72, 74, it suppresses growth of liquid water drops, thereby enabling efficient discharge of the liquid water. It is also applicable that none of the individual cathode gas flow paths 42 are merged with any other one, and that every cathode gas flow path 42 is separated from the other cathode gas flow paths 42 across the entire path range between the two gas manifold holes 72, 74. In this case, the discharge of liquid water will be carried even more easily.

The cathode gas flow paths 42 are provided with constricting portions 43 that are configured to reduce the height of the flow paths in the stacking direction Z and moreover to reduce their flow path cross-sectional area. Preferably, Y-direction width and Z-direction height of the cathode gas flow paths 42 each are set within a range of 0.2 to 1 mm, and the flow path cross-sectional area of the constricting portions 43 is set within a range of 10% to 80% of the flow path cross-sectional area of portions other than the constricting portions 43. Also preferably, the circle-equivalent radius of the flow path cross-sectional area of the constricting portions 43 is set within a range of 100 to 600 µm. These settings will suppress a phenomenon that surface tension of liquid water retards the flow of the liquid water at the constricting portions 43, allowing the liquid water to be discharged easily.

In FIG. 2, plural constricting portions 43 are provided in each of the plural cathode gas flow paths 42. Otherwise, it is also applicable that only one constricting portion 43 is provided in each of the plural cathode gas flow paths 42 or that one constricting portion 43 is provided in only one cathode gas flow path 42. Also preferably, the constricting portions 43 are provided at positions other than outlets of the cathode gas flow paths 42. These placements make it possible to suppress occurrence of a phenomenon where outlets of the cathode gas flow paths 42 are clogged with liquid water so as to retard the flow of the cathode gas into the relevant gas flow paths.

Figure 3A:
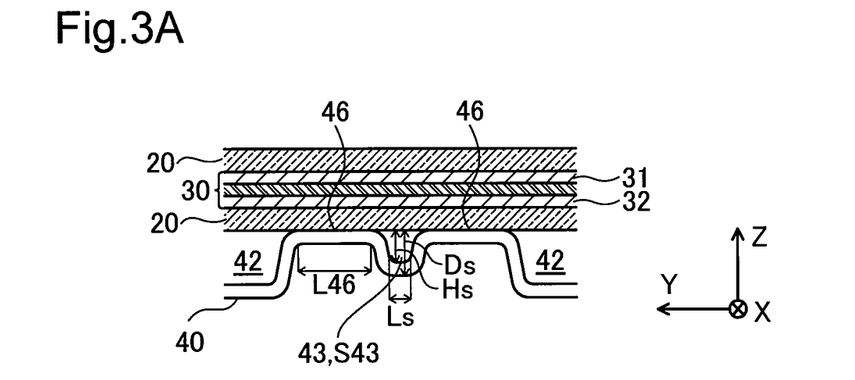
FIGS. 3A-3C are sectional views of cathode gas flow paths.
Figure 3B:
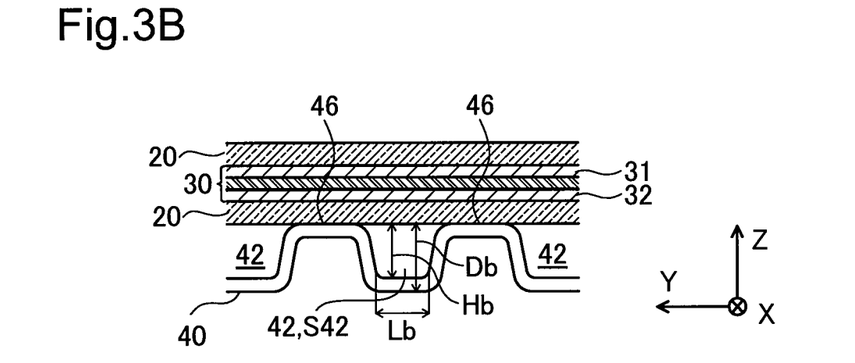

FIGS. 3A-3B are sectional views of the cathode gas flow paths 42. FIG. 3A is a sectional view of a constricting portion 43 taken along the line 3a-3a shown in FIG. 2, and FIG. 3B is a sectional view of a portion of the cathode gas flow paths 42 other than the constricting portion 43 taken along the line 3b-3b shown in FIG. 2. A flow path cross-sectional area S43 of the constricting portion 43 is smaller than a flow path cross-sectional area S42 of a portion of the cathode gas flow path 42 other than the constricting portion 43. In the example of FIG. 3A, a flow-path height Hs of the constricting portion 43 in the stacking direction Z is made smaller than a flow-path height Hb of a portion of the cathode gas flow path 42 other than the constricting portion 43 in the stacking direction Z. An outer-wall height Ds of the constricting portion 43 in the stacking direction Z is made smaller than an outer-wall height Db of a portion of the cathode gas flow path 42 other than the constricting portion 43 in the stacking direction Z. Also, a width Ls of the constricting portion 43 in the vertical direction Y is made smaller than a width Lb of a portion of the cathode gas flow path 42 other than the constricting portion 43 in the vertical direction Y. However, reducing the width Lb of the cathode gas flow path 42 causes a width L46 of a non-flow-path portion 46 to increase, making it difficult for the cathode gas to be diffused into the gas diffusion layer 20 in contact with the cathode-gas non-flow-path portion 46. Therefore, in order to avoid such disturbance of the diffusion of the cathode gas, the width Ls of the constricting portions 43 is preferably kept from being excessively reduced and, for example, set within a range of 30% to 90% of the width Lb of the portion of the cathode gas flow paths 42 other than the constricting portions 43.

Figure 3C:
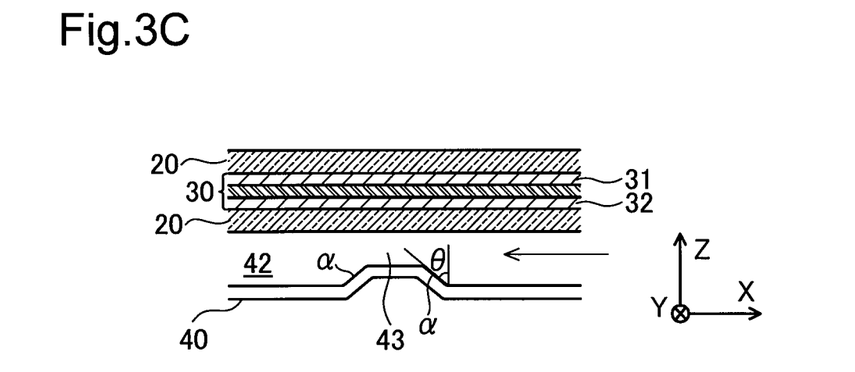

FIG. 3C is a sectional view of the constricting portion 43 taken along the line 3c-3c shown in FIG. 2. An angle θ formed by each one of opposite-side sloped surfaces α of the constricting portion 43 in the horizontal direction X against the stacking direction Z is preferably set within a range of 10° to 80°. This setting will ease discharge of water produced in the power generation region G1 (FIG. 2), without sticking to the sloped surfaces α, out of the cathode gas flow paths 42 along with unreacted cathode gas.

Figure 4:
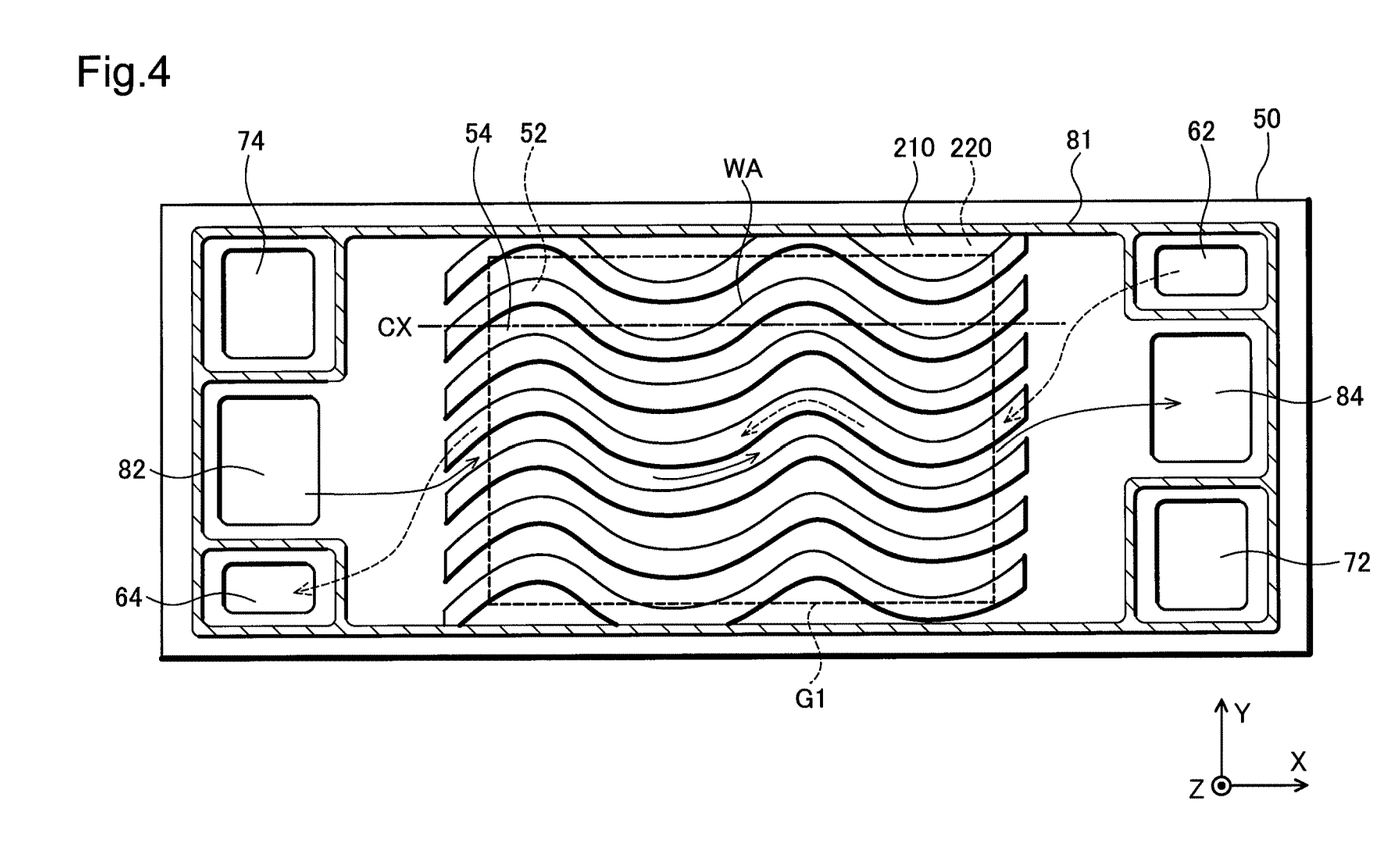
FIG. 4 is a schematic plan view of an anode-side separator.

FIG. 4 is a schematic plan view of the anode-side separator 50 as viewed from a side opposite to the MEGA 21 side. With a plurality of unit cells 140 (FIG. 1) stacked, on the top surface of FIG. 4, the cooling-medium inlet manifold hole 82, the cooling medium flow paths 54 and the cooling-medium outlet manifold hole 84 are communicated with one another, constituting a cooling-medium flow path surface 210. On the backside surface of FIG. 4, the anode-gas inlet manifold hole 62, the anode gas flow paths 52 and the anode-gas outlet manifold hole 64 are communicated with one another, constituting an anode-gas flow path surface 220. The anode gas flow paths 52 are formed on the backside of protruded portions that are protruded in the Z direction in FIG. 4. Solid-line arrows indicate a flow of the cooling medium, and broken-line arrows indicate a flow of anode gas. When a plurality of unit cells 140 (FIG. 1) are stacked, a seal member 81 is put into contact with the surface of the cathode-side separator 40 of another neighboring unit cell 140, serving for sealing between two unit cells 140. The seal member 81 is so placed as to surround the reactant-gas manifold holes 62, 64, 72, 74 and the cooling-medium flow path surface 210, respectively.

Referring to FIG. 4, a power generation region G1 indicated by broken line is a region over which the anode electrode catalyst layer 31 and the cathode electrode catalyst layer 32 of the MEGA 21 (FIG. 1) overlap with each other; the region G1 is equivalent to the power generation region G1 shown in FIG. 2. On the anode side of the power generation region G1, there occurs a reaction having the following formula (2):

$$H_2 \rightarrow 2H_+ + 2e^- \tag{2}$$

Anode gas supplied from the anode-gas inlet manifold hole 62 of the anode-side separator 50 is distributed to the anode gas flow paths 52 as indicated by broken-line arrows in FIG. 4, passing through the gas diffusion layers 20 (FIG. 1) and reaching the anode electrode catalyst layer 31 so as to be utilized for the above reaction. Thereafter, anode gas that has not been utilized for the reaction is gathered by the anode-gas outlet manifold hole 64, then discharged out of the fuel cell stack 100 (FIG. 1). The cooling medium supplied from the cooling-medium inlet manifold hole 82 of the anode-side separator 50, flowing through the cooling medium flow paths 54 as indicated by solid-line arrows in FIG. 4, is gathered by the cooling-medium outlet manifold hole 84, then discharged out of the fuel cell stack 100 (FIG. 1).

In FIG. 4, the anode gas flow paths 52 have curved flow path portions WA that are meandering while the plural anode gas flow paths 52 each maintain a spacing from one another. The curved flow path portions WA may have a bent shape of the anode gas flow paths 52 (a shape in which linear flow path portions and bent portions are alternately formed), instead of the meandering shape of the anode gas flow paths 52. The curved flow path portions WA in the anode-side separator 50 will increase the flow path length of the anode gas flow paths 52, thereby enhancing the utilization efficiency of anode gas.

As to the shape of the curved flow path portions WA, assuming a linear center axis CX parallel to the longitudinal direction (X direction) of the power generation region G1 for each anode gas flow path 52 as shown in the example of FIG. 4, it is preferable that the curved flow path portions WA take a curvilinear, wavy flow path shape (e.g., sinusoidal shape or alternated semicircular-arc shape) that runs along the center axis CX. Such a curvilinear, wavy flow path shape allows a multiplicity of anode gas flow paths 52 to be formed within the power generation region G1 while lengthening the flow path length of each flow path. Preferably, the curved flow path portions WA of the anode gas flow paths 52 may be formed so as to individually maintain a separated state without merging one another across an entire range between both ends of the power generation region G1 in a longitudinal direction (or X-direction). Still further preferably, the linear center axes CX of the individual anode gas flow paths 52 each having a curvilinear, wavy flow path shape may remain parallel to the longitudinal direction (X direction) of the power generation region G1 without being bent in the power generation region G1. These structures will further enhance the utilization efficiency of anode gas.

Figure 5:
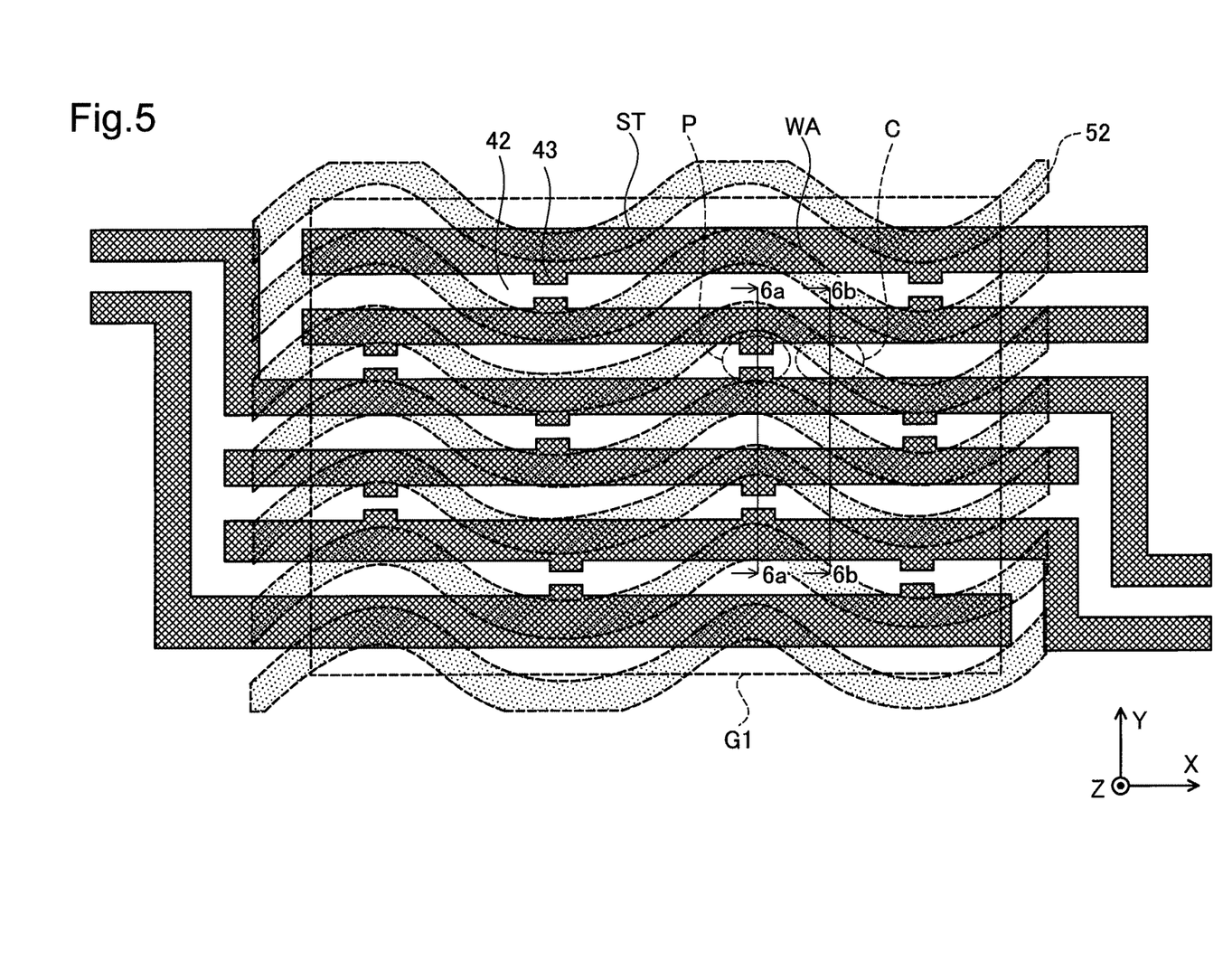
FIG. 5 is a schematic view for explaining an aspect resulting from when cathode gas flow paths and anode gas flow paths are projected and observed in the stacking direction.

FIG. 5 is a schematic view for explaining an aspect resulting when the cathode gas flow paths 42 and the anode gas flow paths 52 are projected and observed along the stacking direction Z. It is noted that portions protruded in the Z direction are hatched for convenience of illustration. The cathode gas flow paths 42, which are formed between the Z-direction protruded portions, are not hatched. The anode gas flow paths 52, which are formed on the backside of the Z-direction protruded portions, are hatched. At a position P of FIG. 5, a cathode gas flow path 42 and an anode gas flow path 52 do not intersect each other, and while at a position C, the cathode gas flow path 42 and the anode gas flow path 52 intersect each other. The constricting portions 43 are provided at non-intersect positions P other than the intersect positions C where the cathode gas flow paths 42 and the anode gas flow paths 52 intersect each other. The reason for this will be described later.

Figure 6A:
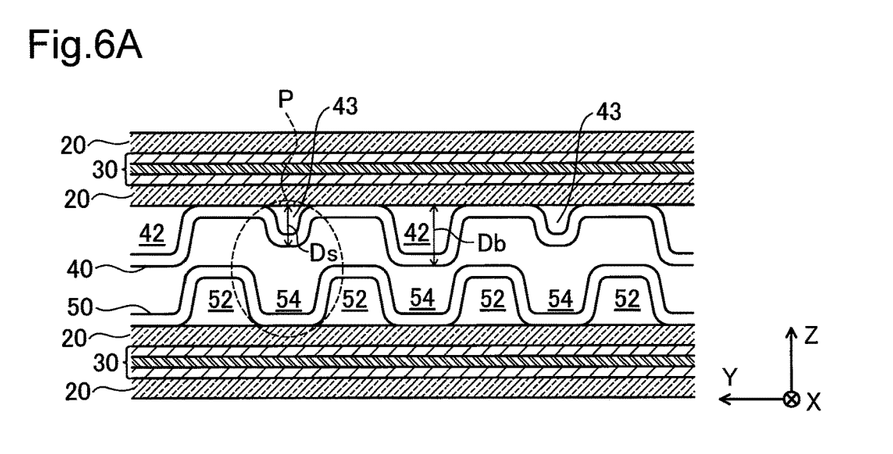
FIGS. 6A-6C are sectional views of a cathode-side separator and an anode-side separator of mutually neighboring unit cells.
Figure 6B:
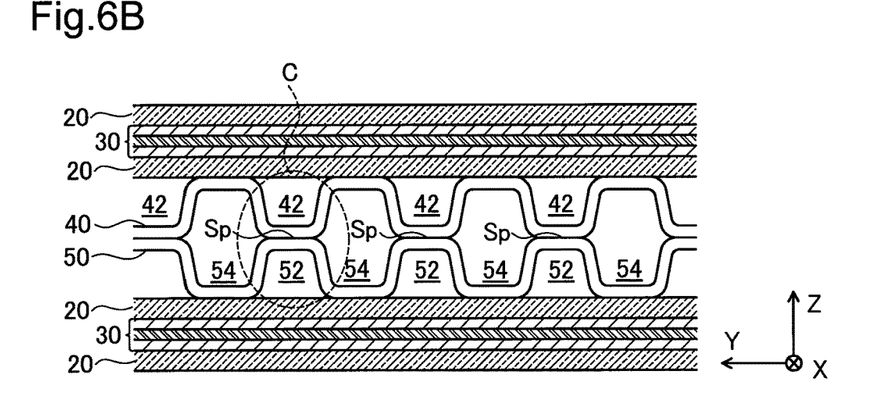
Figure 6C:
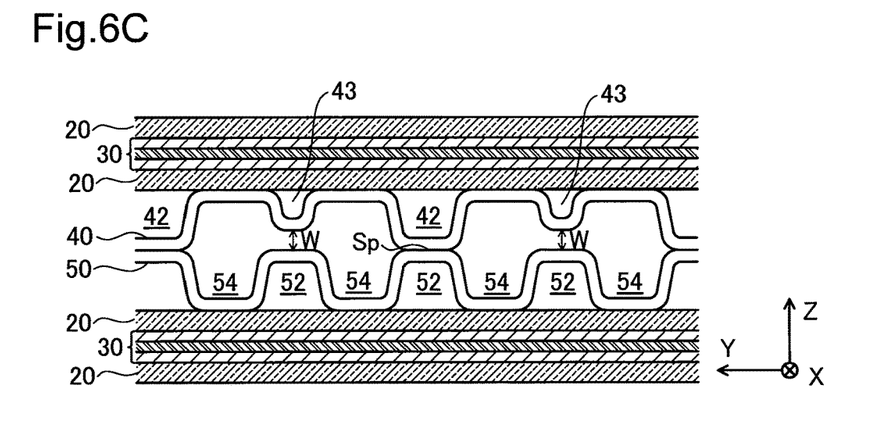

FIGS. 6A-6C are sectional views of the cathode-side separator 40 and the anode-side separator 50 of mutually neighboring unit cells in the state in which a plurality of unit cells 140 (FIG. 1) are stacked. FIG. 6A is an explanatory view taken along the line 6a-6a shown in FIG. 5, and FIG. 6B is an explanatory view taken along the line 6b-6b shown in FIG. 5. In FIG. 6A, at a position P, the cathode gas flow path 42 and the anode gas flow path 52 do not intersect each other, and a constricting portion 43 is provided in the cathode gas flow path 42. Meanwhile, at an intersect position C where the cathode gas flow path 42 and the anode gas flow path 52 intersect each other, as shown in FIG. 6B, there is provided a support portion Sp where no constricting portion 43 is formed in the cathode gas flow path 42, and where the cathode-side separator 40 and the anode-side separator 50 are in contact with each other to support each other. FIG. 6C shows an imaginary case where the constricting portion 43 were formed at the intersect position C; this configuration would cause a gap W to be formed at the position of the support portion Sp of FIG. 6B. This configuration would reduce the number of the support portions Sp (contact portions) between the separators 40, 50, resulting in a likelihood that compressive force would excessively concentrated to a smaller number of support portions Sp. On the other hand, at the positions P where the cathode gas flow path 42 and the anode gas flow path 52 do not intersect each other as shown in FIG. 6A, the separators are out of contact with each other regardless of whether or not the constricting portion 43 is provided, where such problems as described above never occur. In consideration of these points, preferably, the constricting portions 43 are provided at positions other than the intersect positions between the cathode gas flow paths 42 and the anode gas flow paths 52.

In FIG. 6A, the cathode gas flow paths 42 are placed at positions overlapping with the cooling medium flow paths 54, as viewed in the stacking direction Z, the placement being shifted from the anode gas flow paths 52. The outer-wall height Ds of the constricting portions 43 is smaller than the outer-wall height Db of portions of the cathode gas flow paths 42 other than the constricting portions 43, so pressure loss of the cooling medium can be reduced.

Figure 7:
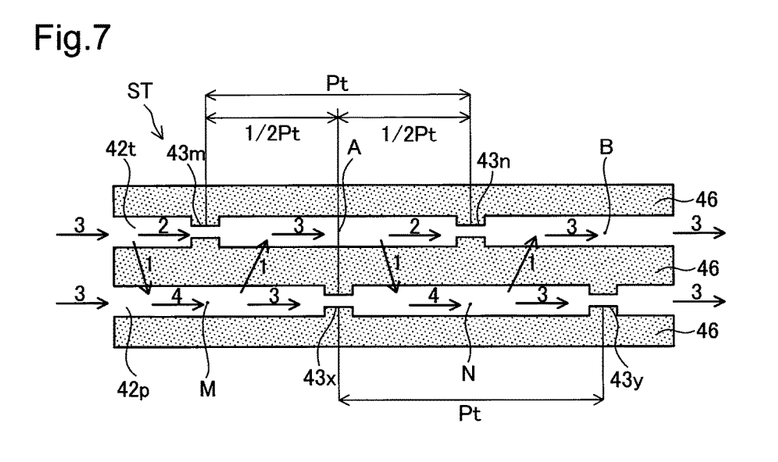
FIG. 7 is a schematic view for explaining an aspect in which cathode gas flows through cathode gas flow paths.

FIG. 7 is a schematic view for explaining an aspect in which cathode gas flows through neighboring two cathode gas flow paths 42t, 42p at an equal flow rate (a relative flow rate of 3). Shown in FIG. 7 is part of the straight flow path portions ST (FIG. 2) of the cathode gas flow paths 42. For convenience of illustration, non-flow-path portions 46 between two mutually neighboring cathode gas flow paths 42 are hatched. The two cathode gas flow paths 42t, 42p each are provided with two constricting portions 43m, 43n, and 43x, 43y. Preferably, these four constricting portions 43m, 43n, 43x, 43y are placed such that they are not to neighbor each other in a direction perpendicular to a direction (rectilinear direction) in which the two cathode gas flow paths 42t, 42p run in parallel. The reason for this will be described later.

Referring to FIG. 7, the constricting portions 43m, 43n of the first cathode gas flow path 42t cause a reduction in the flow path cross-sectional area, leading to increases in the pressure of cathode gas on the upstream side of the individual constricting portions 43m, 43n. On the other hand, in the second cathode gas flow path 42p, since no constricting portions are provided at positions M, N neighboring the constricting portions 43m, 43n, respectively, the pressure of cathode gas on the upstream side of the positions M, N is smaller than the pressure of cathode gas on the upstream side of the individual constricting portions 43m, 43n, causing differential pressures to occur. Similarly, in the first cathode gas flow path 42t, differential pressures occur on the upstream side of positions A, B neighboring the individual constricting portions 43x, 43y of the second cathode gas flow path 42p, respectively. That is, the cathode gas flow paths on the upstream side of the constricting portions 43m, 43n, 43x, 43y undergo occurrence of pressure differences relative to their neighboring cathode gas flow paths, respectively. As a result of this, the cathode gas is allowed to move from higher-pressure side cathode gas flow paths through the gas diffusion layers 20 (FIGS. 3A-3C) in contact with the non-flow-path portions 46 to lower-pressure side cathode gas flow paths.

As shown in FIG. 7, it is assumed that when cathode gas having a total relative flow rate of 6 flows to the two cathode gas flow paths 42t, 42p, cathode gas having a relative flow rate of 1 moves through the flow paths having differential pressures. In addition, although cathode gas, while flowing into the cathode gas flow paths, undergoes reactions in the power generation region and decreases in flow rate, decreases in the flow rate due to the reactions are not taken into consideration in FIG. 7 for explanation's sake. When the cathode gas having a relative flow rate of 3 flows in through inlets of the individual cathode gas flow paths 42t, 42p, there occurs a differential pressure on the upstream side of the constricting portion 43m, so that out of the cathode gas having a relative flow rate of 3 flowing into the first cathode gas flow path 42t, cathode gas having a relative flow rate of 1 moves into the second cathode gas flow path 42p. Then, cathode gas flowing through the position M of the cathode gas flow path 42p comes to have a relative flow rate of 4. When this cathode gas having a relative flow rate of 4 has reached the upstream side of the constricting portion 43x, cathode gas having a relative flow rate of 1 out of the above-mentioned cathode gas is moved by the differential pressure again to the first cathode gas flow path 42t. In this way, on each upstream side of the constricting portions 43m, 43x that are not neighboring each other, there occurs movement of cathode gas between the cathode gas flow paths. Similarly, also on each upstream side of the non-neighboring constricting portions 43n, 43y, there occurs movement of the cathode gas between the cathode gas flow paths. With such arrangement that the constricting portions 43m, 43n, 43x, 43y are placed at mutually non-neighboring positions in a direction perpendicular to the direction in which the two cathode gas flow paths 42t, 42p run in parallel, there occurs movement of the cathode gas between the two cathode gas flow paths 42t, 42p. In this case, each time the cathode gas moves, the cathode gas is diffused in larger quantities into the gas diffusion layers 20 (FIGS. 3A-3C) in contact with the non-flow-path portions 46, making it possible to enhance the utilization efficiency of cathode gas. Further, since the cathode gas is sufficiently diffused under the non-flow-path portions 46, nonuniformities of power generation between the cathode gas flow paths 42t, 42p and the non-flow-path portions 46 can be reduced.

The effect that the increased quantities of cathode gas are diffused to the gas diffusion layers 20 in contact with the non-flow-path portions 46 can be obtained even when one constricting portion 43 is provided in one cathode gas flow path among the plural cathode gas flow paths 42. However, it is preferable that one or more constricting portions 43 are provided in each of neighboring cathode gas flow paths 42t, 42p as in the case of FIG. 7. Also, it is more preferable that an equal number of constricting portions 43 are provided in each of the cathode gas flow paths 42t, 42p. A particularly preferable embodiment is that a plurality of constricting portions 43 are provided at a regular pitch Pt on each of the cathode gas flow paths 42t, 42p while constricting portions 43 in neighboring cathode gas flow paths 42t, 42p are placed at positions shifted from one another by one half of the pitch Pt. In these preferable embodiments, the utilization efficiency of cathode gas can be further enhanced by the reasons described above.

A positional relation among the constricting portions 43 in the straight flow path portions ST of the cathode gas flow paths 42 has been described above in conjunction with FIG. 7. Otherwise, it is also applicable that a plurality of cathode gas flow paths 42 have a curved flow path shape in which those flow paths run in parallel while meandering or bent. In this case also, the constricting portions 43 provided in each of neighboring cathode gas flow paths 42 may be placed at mutually non-neighboring positions in a direction perpendicular to the parallel-running direction. The parallel-running direction in this case is a direction along a tangential line of a center line passing through a center of each flow path.

In the first embodiment, as described above, since the constricting portions 43 of the cathode gas flow paths 42 are provided at positions other than the intersect positions C where the cathode gas flow paths 42 and the anode gas flow paths 52 intersect each other, it will prevent excessive concentration of compressive force to the smaller number of support positions Sp (or contact portions) due to placement of the constricting portions 43 at the intersect positions C.

Second Embodiment

Figure 8:
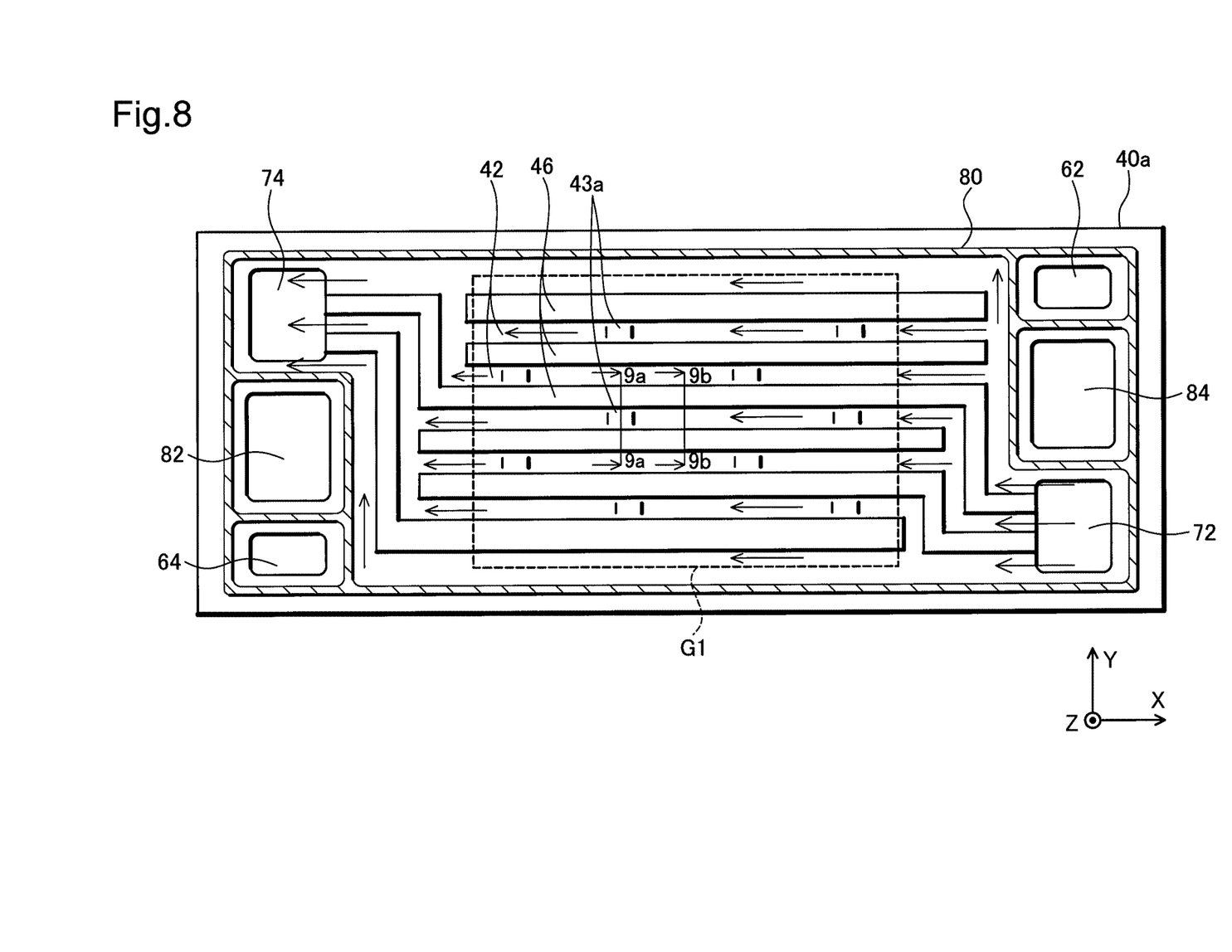
FIG. 8 is a schematic plan view of a cathode-side separator according to a second embodiment.

FIG. 8 is a schematic plan view of a cathode-side separator 40a as viewed from the MEGA 21 side in a second embodiment. This embodiment differs from the first embodiment shown in FIG. 2 only in the shape of constricting portions 43a, the rest of the structure being similar to that of the first embodiment.

Figure 9A:
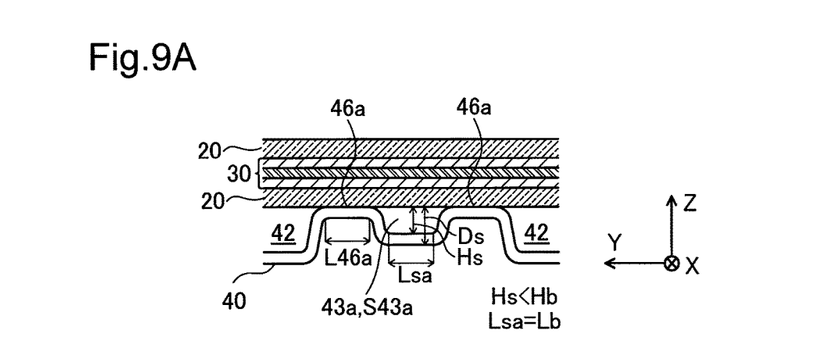
FIGS. 9A-9B are sectional views of cathode gas flow paths in the second embodiment.
Figure 9B:
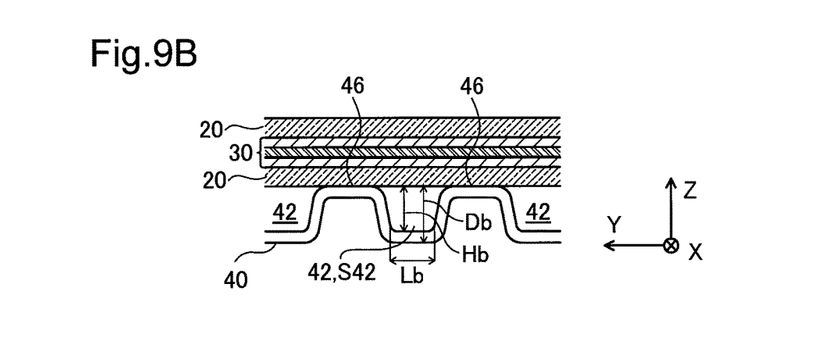

FIGS. 9A-9B are sectional views of the cathode gas flow paths 42 in the second embodiment. FIG. 9A is a sectional view taken along the line 9a-9a of a constricting portion 43a shown in FIG. 8, and FIG. 9B is a sectional view of a portion of the cathode gas flow path 42 other than the constricting portion 43a taken along the line 9b-9b shown in FIG. 8. A flow path cross-sectional area S43a of the constricting portion 43a is smaller than a flow path cross-sectional area S42 of the portion of the cathode gas flow path 42 other than the constricting portion 43a. A flow-path height Hs of the constricting portion 43a in the stacking direction Z is smaller than a flow-path height Hb of the portion of the cathode gas flow path 42 other than the constricting portion 43a in the stacking direction Z. An outer-wall height Ds of the constricting portion 43a in the stacking direction Z is smaller than an outer-wall height Db of the portion of the cathode gas flow path 42 other than the constricting portion 43a in the stacking direction Z. Further, a width Lsa of the constricting portion 43a in the vertical direction Y is equal to a width Lb of the portion of the cathode gas flow path 42 other than the constricting portion 43a in the vertical direction Y. With the shape of this second embodiment, since a width L46a of each non-flow-path portion 46a present on both sides of the constricting portion 43a is smaller than the width L46 of each non-flow-path portion 46 of the first embodiment shown in FIG. 3A, the diffusion distance of cathode gas into the gas diffusion layers 20 in contact with the non-flow-path portions 46a becomes shorter than in the first embodiment, so that the cathode gas is more easily diffused. In consideration of this point, it is preferable to adopt, as the shape of the constricting portions 43, a shape in which the height (depth of the flow paths) is reduced while the flow-path width being unchanged.

Modifications

The present disclosure is not limited to the above-described examples and embodiments, and may be carried out in other various modes unless those modes depart from the gist of the disclosure, the other modes exemplified by the following modifications.

Modification 1:

In the above-described embodiments, the constricting portions 43 are provided only in the cathode gas flow paths 42. Instead, the constricting portions 43 may be provided in the anode gas flow paths 52. Alternatively, the constricting portions 43 may be provided in both the cathode gas flow paths 42 and the anode gas flow paths 52. However, also in these cases, it is preferable that all the constricting portions 43 are provided at positions other than the intersect positions between the cathode gas flow paths 42 and the anode gas flow paths 52 as projected and viewed in the stacking direction Z. Further, whereas the constricting portions 43 are placed at positions other than inlets and outlets of the straight flow path portions ST in the foregoing embodiments, the constricting portions 43 may also be placed at other positions. For example, the constricting portions 43 may be provided at inlets and outlets, alternately, of two neighboring gas flow paths of the straight flow path portions ST.

Modification 2:

The above-described embodiments have been described in cases where the plural anode gas flow paths 52 have curved flow path portions WA that are meandering or bent while maintaining a spacing from one another, and where the plural cathode gas flow paths 42 have straight flow path portions ST that extend parallel and linearly along the longitudinal direction of the separators. However, the disclosure in general may also be applied to cases where a plurality of cathode gas flow paths and a plurality of anode gas flow paths have mutually different two-dimensional shapes, respectively. An example may be that a plurality of anode gas flow paths have straight flow path portions while a plurality of cathode gas flow paths have curved flow path portions. Another example may be that both a plurality of cathode gas flow paths and a plurality of anode gas flow paths have straight flow path portions, respectively, where running directions of those respective straight flow path portions intersect each other. Still another example may be that a plurality of cathode gas flow paths and a plurality of anode gas flow paths have curved flow path portions, respectively, and moreover have such two-dimensional shapes, respectively, that there exist intersect positions where the cathode gas flow paths and the anode gas flow paths intersect each other as projected in the unit-cell stacking direction.

The disclosure is not limited to the above-described embodiments and modifications, and may be implemented in various ways within a scope that does not depart from its gist. For example, technical features in the embodiments and modifications corresponding to technical features in the individual modes described in the section of SUMMARY may be interchanged or combined in various ways as required in order to solve part or entirety of the above-described problems or to achieve part or entirety of the above-described advantageous effects. Furthermore, component elements other than elements described in the independent claims out of the component elements in the above-described embodiments and modifications are additional elements and therefore may be omitted as required.

What is claimed is:

1. A fuel-cell unit cell for making up a fuel cell stack in which a plurality of fuel-cell unit cells are stacked while a cathode-side separator and an anode-side separator of neighboring fuel-cell unit cells are in contact with each other, the fuel-cell unit cell comprising:
  a membrane electrode and gas diffusion layer assembly;
  a cathode-side separator made of a press-molded plate, the cathode-side separator forming a plurality of cathode gas flow paths and non-flow-path portions therebetween on a cathode-side surface of the membrane electrode and gas diffusion layer assembly; and
  an anode-side separator made of a press-molded plate, the anode-side separator forming a plurality of anode gas flow paths and non-flow-path portions therebetween on an anode-side surface of the membrane electrode and gas diffusion layer assembly, wherein
  at least one gas flow path among the plural cathode gas flow paths and the plural anode gas flow paths includes a constricting portion that is configured to reduce a flow-path height in a stacking direction of the fuel-cell unit cells as well as to reduce a flow path cross-sectional area of the gas flow path, and
  when projected and observed along the stacking direction, the plural cathode gas flow paths and the plural anode gas flow paths are configured to have mutually different two-dimensional shapes, there exist intersect positions at which the cathode gas flow paths and the anode gas flow path intersect each other, and the constricting portion is provided at a position other than the intersect positions.

2. The fuel-cell unit cell in accordance with claim 1, wherein
  one of the plural cathode gas flow paths and the plural anode gas flow paths are configured to have straight flow path portions over which a plurality of gas flow paths extend linearly and parallel to one another, and the other of the plural cathode gas flow paths and the plural anode gas flow paths are configured to have curved flow path portions in which a plurality of gas flow paths are meandering or bent while maintaining a spacing from one another.

3. The fuel-cell unit cell in accordance with claim 2, wherein
  the straight flow path portions are provided in the cathode-side separator, and
  the curved flow path portions are provided in the anode-side separator.

4. The fuel-cell unit cell in accordance with claim 1, wherein
  the constricting portion is provided in each of two gas flow paths neighboring and running in parallel to each other in at least one of the plural cathode gas flow paths and the plural anode gas flow paths, and the constricting portions provided in the two gas flow paths are placed at non-neighboring positions in a direction perpendicular to a direction of the parallel running.

5. The fuel-cell unit cell in accordance with claim 1, wherein
  the constricting portion is provided at a position other than an outlet of the at least one gas flow path.

6. The fuel-cell unit cell in accordance with claim 1, further comprising a support portion where there is no constricting portion formed in the cathode gas flow path and where the cathode-side separator and the anode-side separator are in contact with each other.

7. The fuel-cell unit cell in accordance with claim 1, wherein at positions where the cathode gas flow path and the anode gas flow path do not intersect each other, the cathode-side separator and anode-side separator are out of contact with each other.

* * * * *